United States Patent
Bouiller et al.

(10) Patent No.: US 10,557,376 B2
(45) Date of Patent: Feb. 11, 2020

(54) TURBINE ENGINE UNIT FOR LUBRICATING A BEARING HOLDER

(71) Applicant: SAFRAN AIRCRAFT ENGINES, Paris (FR)

(72) Inventors: Philippe Pierre Vincent Bouiller, Moissy-Cramayel (FR); Frederic Francois Jean-Yves Patard, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 303 days.

(21) Appl. No.: 15/575,654

(22) PCT Filed: May 20, 2016

(86) PCT No.: PCT/FR2016/051197
§ 371 (c)(1),
(2) Date: Nov. 20, 2017

(87) PCT Pub. No.: WO2016/189234
PCT Pub. Date: Dec. 1, 2016

(65) Prior Publication Data
US 2018/0119575 A1    May 3, 2018

(30) Foreign Application Priority Data
May 22, 2015  (FR) ..................... 15 54621

(51) Int. Cl.
*F01D 25/18*     (2006.01)
*F16C 33/66*     (2006.01)
(Continued)

(52) U.S. Cl.
CPC ............. *F01D 25/18* (2013.01); *F01D 9/065* (2013.01); *F01D 25/162* (2013.01);
(Continued)

(58) Field of Classification Search
CPC ........ F01D 25/18; F01D 9/065; F01D 25/162; F01D 25/183; F01D 25/24; F02C 7/06;
(Continued)

(56) References Cited

U.S. PATENT DOCUMENTS

| 3,312,448 A | * | 4/1967 | Huil, Jr. .................. | F16C 33/76 415/175 |
| 4,467,610 A | * | 8/1984 | Pearson .................. | F02C 7/222 138/114 |

(Continued)

FOREIGN PATENT DOCUMENTS

| EP | 1 553 263 A1 | 7/2005 |
| WO | 00/22281 A1 | 4/2000 |

OTHER PUBLICATIONS

International Search Report dated Sep. 22, 2016, in PCT/FR2016/051197 filed May 20, 2016.
(Continued)

*Primary Examiner* — Michael A Riegelman
(74) *Attorney, Agent, or Firm* — Oblon, McClelland, Maier & Neustadt, L.L.P.

(57) ABSTRACT

A turbine engine unit for lubricating a bearing holder. A turbine engine unit is provided, including an inter-turbine housing that includes a hub including a bearing holder, a ferrule extending around and at a distance from the hub, at least one arm extending radially between the hub and the ferrule, and at least one lead-through for lubricating the bearing holder. The lead-through includes a first pipe having an end portion that can be screwed onto the hub so as to place the first pipe in fluid communication with the bearing holder, an intermediate portion secured to the end portion placed inside the arm when the end portion is screwed onto the hub, and a clamping portion secured to the end portion and rotatable by a clamping tool. The turbine engine unit is characterized in that the clamping portion is located between
(Continued)

the screwable end portion and the intermediate portion. A corresponding turbine engine unit assembly method is also provided.

10 Claims, 13 Drawing Sheets

(51) Int. Cl.
*F02C 7/06* (2006.01)
*F01D 9/06* (2006.01)
*F01D 25/16* (2006.01)
*F01D 25/24* (2006.01)

(52) U.S. Cl.
CPC .............. *F01D 25/183* (2013.01); *F02C 7/06* (2013.01); *F16C 33/6659* (2013.01); *F01D 25/24* (2013.01); *F05D 2220/30* (2013.01); *F05D 2230/60* (2013.01); *F05D 2260/31* (2013.01); *F16C 2360/23* (2013.01)

(58) Field of Classification Search
CPC .............. F16C 33/6659; F16C 2360/23; F05D 2220/30; F05D 2230/60; F05D 2260/31
See application file for complete search history.

(56) References Cited

U.S. PATENT DOCUMENTS

| | | | | |
|---|---|---|---|---|
| 4,972,671 A * | 11/1990 | Asselin | ............... | F01D 9/065 184/6.11 |
| 5,160,251 A * | 11/1992 | Ciokajlo | ............... | F01D 25/162 415/142 |
| 6,102,577 A * | 8/2000 | Tremaine | ............... | F01D 9/065 184/104.1 |
| 6,438,938 B1 * | 8/2002 | Burkholder | ............. | F01D 9/065 184/6.11 |
| 7,063,357 B1 * | 6/2006 | Bay | ....................... | F16L 13/147 285/246 |
| 8,641,101 B2 * | 2/2014 | Guclucan | ............... | F01D 25/18 285/220 |
| 8,944,749 B2 * | 2/2015 | Durocher | ............... | F01D 9/065 415/1 |
| 10,392,969 B2 * | 8/2019 | Kapustka | ............. | F01D 25/162 |
| 2005/0199445 A1 * | 9/2005 | Zalewski | ............... | F01D 9/065 184/6.5 |
| 2005/0247043 A1 * | 11/2005 | Derenes | ................. | F01D 9/065 60/226.1 |
| 2011/0085895 A1 * | 4/2011 | Durocher | ............... | F01D 9/065 415/178 |
| 2012/0011824 A1 * | 1/2012 | Cigal | ..................... | F01D 9/065 60/39.08 |
| 2015/0267558 A1 * | 9/2015 | Summers | ............... | F01D 25/24 415/201 |
| 2016/0340053 A1 * | 11/2016 | Curlier | .................... | F01D 9/065 |
| 2017/0058696 A1 * | 3/2017 | Manteiga | ................. | F01D 9/02 |
| 2018/0119575 A1 * | 5/2018 | Bouiller | ................. | F01D 9/065 |

OTHER PUBLICATIONS

French Preliminary Search Report dated Mar. 9, 2016 in Patent Application No. 1554621 (with English language translation of categories of cited documents).

* cited by examiner

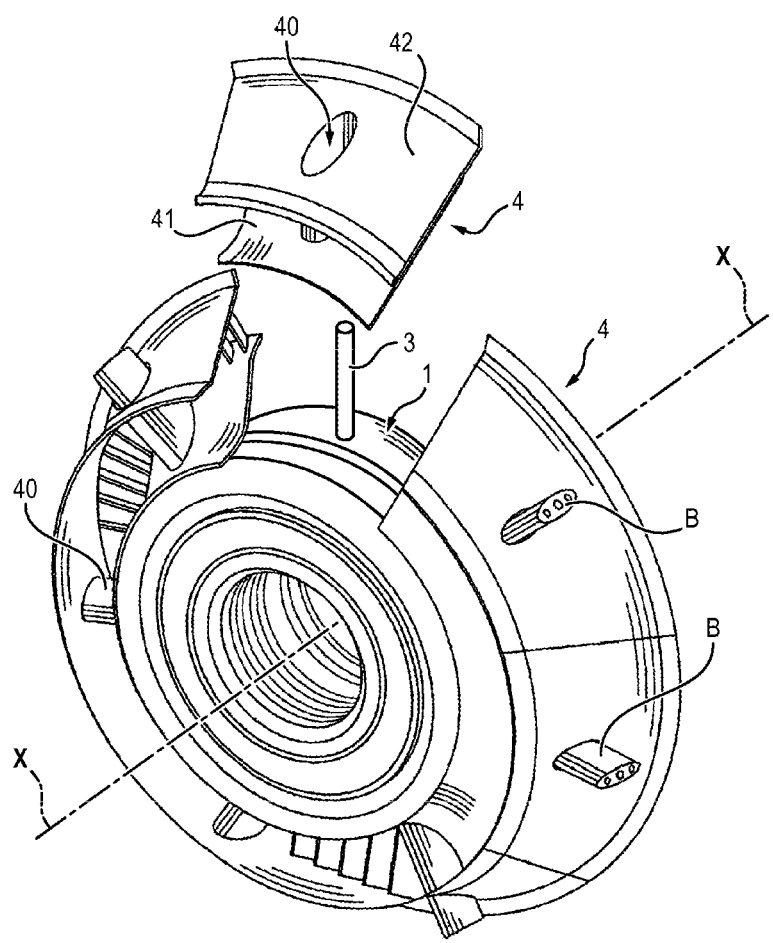
FIG. 3bis

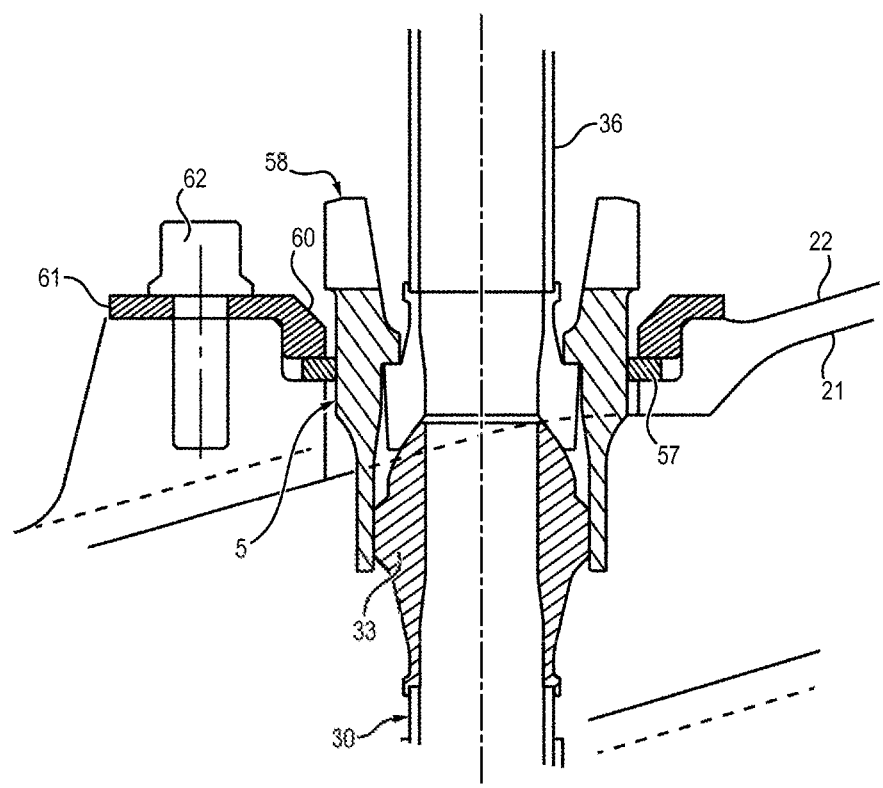
FIG. 6bis

TURBINE ENGINE UNIT FOR LUBRICATING A BEARING HOLDER

GENERAL FIELD

The invention relates to a turbine engine unit designed to be arranged between two turbines, this unit being designed to allow the lubrication of a bearing holder of the turbine engine.

PRIOR ART

A conventional turbine engine can comprise two turbines movable around a principal axis of the turbine engine: a high-pressure turbine and a low-pressure turbine arranged downstream of the high-pressure turbine, movable in rotation around a principal axis.

Such a turbine engine also comprises a structure called a bearing holder, which extends between the two turbines. The bearing holder has, as its name indicates, the function of serving as a holder for movable bearings).

The turbine engine comprises a housing extending between the two turbines (called conventionally the "inter-turbine" housing), the housing being arranged around the bearing holder with respect to the principal axis.

Illustrated in FIG. 1 is an inter-turbine housing which comprises a hub 1, a plurality of connecting arms B and an external ferrule 2. The arms B are arranged at angular positions spaced from one another with respect to the axis X (corresponding to the axis of rotation of the turbines).

The connecting arms B are designed to be connected to the external ferrule 2 which extends around and at a distance from the hub 1.

With reference to FIG. 2, an aerodynamic fairing 4 is disposed around each connecting arm B. A fairing 4 comprises in particular a hollow aerodynamic arm 40 which surrounds a connecting arm B and two facing walls connected together by the aerodynamic arm 40.

The assembly of aerodynamic fairings 4 is formed to jointly define a generally annular gas flow space between the hub 1 and the ferrule, this space being locally interrupted by each aerodynamic arm 40. Gas can thus pass between two adjoining arms 40.

The aerodynamic fairings 4 are suitable for re-directing gas coming from the high-pressure turbine toward the low-pressure turbine.

However, the bearing holder requires an oil feed to be lubricated. Feeding oil to the bearing holder is typically provided by at least one lead-through (not shown in FIGS. 1 and 2) radially crossing the body of the inter-turbine housing.

In order not to hinder the flow of a gas between the aerodynamic arms 40, it is known to provide a hollow passage in a connecting arm B and to place a lead-through extending radially inside this passage. Thus, the lead-through can reach the bearing holder by passing radially through the body of the inter-turbine housing.

In most known turbine engines, the lead-through is attached to the hub 1 through a connector constituting an independent part. The connector has a first end suitable for being attached to the bearing holder, and a second end, opposite, the first end, suitable for being attached to the lead-through partially placed inside a structural arm.

The connector is confined in a space left between the bearing holder and the hub of the inter-turbine housing that surrounds it.

One objective generally sought by turbine engine designers is to place the inter-turbine housing hub as close as possible to the bearing holder, so as to increase its gas flow rate for a pre-determined size of the housing (in example d, this amounts to keeping the hub 1 close to the axis X).

However, the connector situated between the hub and the bearing holder has a relatively bulky diameter which limits such a convergence.

A first solution allowing this limitation to be circumvented could theoretically be to place the connector inside the connecting arm B. However, such a solution would require increasing the diameter of the arm B, and consequently that of the aerodynamic arm 40 that surrounds it. The arm 40 would then occupy a greater space in the gas flow space defined between the hub and the external ferrule of the inter-turbine housing, which would reduce the gas flow rate allowed between the two turbines.

Another solution for putting the hub 1 close to the axis of the turbine engine (and of the bearing holder) was proposed in document CA 2715600 A1. This solution consists of a lead-through directly screwed to the hub. No bulky interconnection part is then used.

With reference to FIG. 2 of document CA 2715600 A1 this lead-through also comprises a first end portion designed to be screwed to the bearing holder, as well as a second end portion, opposite the first end portion, having a collar and a lead-through tightening support.

The two end portions are connected by an intermediate portion designed to be placed inside a hollow structural arm extending between the hub and the external ferrule.

When the end portion is screwed to the bearing holder and the intermediate portion is placed inside the hollow structural arm, the clamp is located farther from the bearing holder than the external ferrule.

However, the collar limits the axial displacement once screwed to the bearing holder. The presence of this collar imposes screwing of the lead-through to the hub only after assembly of the external ferrule(s) around the hub.

Moreover, to attach lead-through to the hub, an operator engages a gripping tool with the clamp, and drives the lead-through in rotation. This rotation is transmitted to the end that can be screwed of the lead-through, through the portion.

The intermediate portion of the lead-through placed inside the arm is then subjected to a consequent torsion load during screwing of the lead-through to the hub.

This torsion load imposes an increase in thickness of the tubular wall of the lead-through at the intermediate portion.

Moreover, if it is desired that the lead-through retain a constant feed rate, it is necessary not to reduce its inner diameter, but rather to increase its outer diameter than consequently its bulk in the radial arm that accommodates it.

This increase in the outer diameter of the lead-through requires a further increase in the dimensions of the structural arm which it passes through, with the consequence of reducing the flow rate of gas in the annular space between the two turbines.

PRESENTATION OF THE INVENTION

The invention aims to place, in a turbine engine, an inter-turbine housing close to a bearing holder requiring lubrication, without however reducing the flow rate of gas transiting the inter-turbine housing or reducing the feed flow rate of lubricant of the bearing holder.

The invention also aims to simplify disassembly and/or replacement of an inter-turbine housing. It is desired in particular to be able to disassembly the inter-turbine housing without having to completely disassembly the lead-through.

The invention also aims to limit the deterioration of the connection of the lead-through with the bearing holder caused by disassemblies of the inter-turbine housing.

A unit for a turbine engine is therefore proposed, comprising:
- an inter-turbine housing comprising:
  - a hub comprising a bearing holder,
  - a ferrule extending around and at a distance from the hub,
  - at least one arm extending radially between the hub and the ferrule,
  - at least one lead-through for lubricating the bearing holder, the lead-through comprising a first pipe having:
    - an end portion that can be screwed to the hub to put the first pipe into fluid communication with the bearing holder,
    - an intermediate portion attached to the end portion, placed inside the arm when the end portion is screwed to the hub,
    - a tightening portion attached to the end portion and suitable to be driven in rotation by a tightening gripping tool,
wherein the tightening portion is situated between the end portion that can be screwed and the intermediate portion.

In the first place, the tightening support of the unit according to the present invention is located much closer to the end portion designed to be screwed to the bearing holder, compared to the arrangement proposed in the prior art.

When an operator rotates the tightening support by means of a gripping tool to screw the lead-through to the bearing holder, no considerable torsion load is transmitted to the intermediate portion provided for placement in the hollow structural arm.

Consequently, it is perfectly possible to reduce the outer diameter of the intermediate portion, without risk of deformation or of rupture of the lead-through resulting from screwing it in too tightly. The dimensions of the connecting arm can therefore be reduced, which increases the gas flow rate in the gas flow space defined between the hub and the external ferrule of the inter-turbine housing.

Moreover, the fact of arranging the tightening support between the intermediate portion which is placed inside the structural arm and the end portion screwed to the bearing holder results in the tightening support being located between the hub and the bearing holder.

Moreover, the tightening support does not require a considerable radial size. In this manner, it is possible, thanks to the invention, to have the inter-turbine housing still closer to the bearing holder in a radial direction, comparatively to turbine engines the lead-throughs whereof are connected to the holder by means of an additional interconnection part arranged radially between the lead-through and the bearing holder.

The invention can also be completed by the following features taken atone or in any one of their technically possible combinations.

The unit can comprise at least one seal for putting the end portion into sealed fluid communication with the bearing holder, when the end portion is screwed to the hub.

The tightening portion can comprise a plurality of tightening flats defining a free surface of polygonal section grippable by a gripping tool.

It can also be provided that:
- the ferrule has an annular shape around a principal axis, and has at Least one radial through opening,
- the first pipe comprises a second end portion opposite to the end portion which can be screwed to the hub,
- the first pipe has a sufficiently short length to allow insertion, along the principal axis, of the hub and of the first pipe screwed to the hub into the ferrule, until the second end portion is aligned with the radial opening, the ferrule extending around the first pipe screwed to the hub.

The lead-through can also comprise a second pipe suitable for being put into fluid communication with the first pipe, the lead-through having dimensions suitable for passing through the radial opening of the ferrule.

The first pipe can comprise a second end portion opposite to the end portion which can be screwed to the hub, the lead-through having, from the intermediate portion included until the second end portion, an outer diameter smaller than or equal to the minimum inner diameter of the arm.

The lead-through can also comprise thermal insulation suitable for extending around the intermediate portion of the first pipe, the thermal insulation having an outer diameter strictly less than or equal to the minimum inner diameter of the arm.

The end portion can have an external guide surface, and the hub comprise a cavity to receive the end portion that can be screwed, the cavity having a diameter complementary to the external guide surface.

The first pipe can comprise a portion forming a collar arranged between the end portion which can be screwed and the tightening portion, the collar having a surface suitable for coming into abutment against the hub during screwing of the end portion to the hub.

According to a second aspect of the invention, an assembly method is proposed for this turbine engine unit, comprising steps of screwing the end portion to the hub, by driving in rotation the tightening portion using a gripping tool, so as to put the first pipe into fluid communication with the bearing holder, insertion of the intermediate portion into the arm, attachment of the arm to the ferrule in which the screwing step is implemented before the insertion step and/or before the attachment step.

DESCRIPTION OF THE FIGURES

Other features, aims and advantages of the invention will be revealed by the description that follows, which is purely illustrative and not limiting, and which must be read with reference to the appended drawings wherein:

FIG. 3bis is a partial three-dimensional view of the turbine engine unit already shown in FIG. 3.

FIG. 6bis is an enlarged view of another portion of the turbine engine unit shown in FIG. 3, according to a second embodiment.

DETAILED DESCRIPTION OF THE INVENTION

Figure 3:
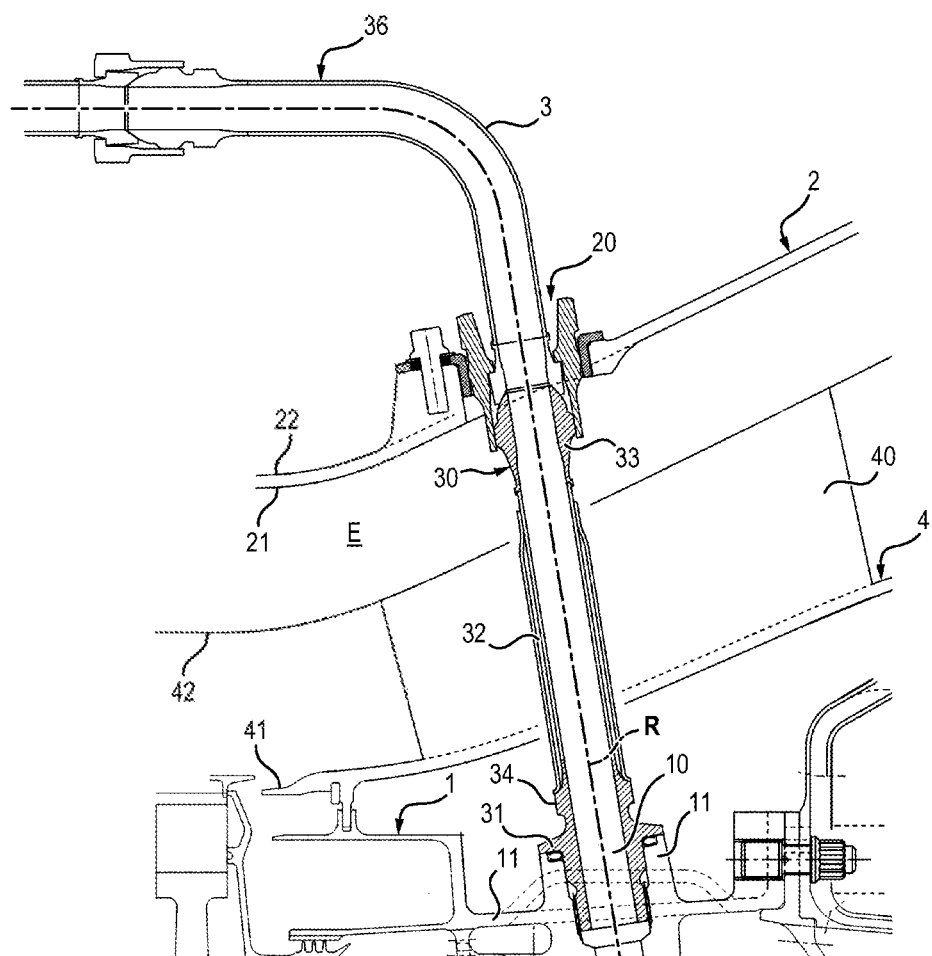
FIG. 3 is a partial profile view of a unit for a turbine engine according to an embodiment of the invention.

With reference to FIGS. 3 and 3bis, a turbine engine unit comprises an inter-turbine housing extending around an axis X.

Hereafter, the term "centrifugal" designates a direction of convergence toward the principal axis X, and the term "centripetal" a direction of distancing from the principal axis X.

In the turbine engine, the inter-turbine housing is located between two turbines movable in rotation around this axis X.

The turbine housing comprises a hub 1 and an external ferrule 2, and at least one connecting arm B connecting the hub to the external ferrule 2.

The hub 1 extends around the principal axis X of the turbine engine. The hub has a generally annular body extending from a shaft of the turbine engine centered on this axis X (not illustrated in the figures).

The hub 1 comprises a bearing holder.

The hub 1 also has a radially external surface 11 into which at least one access opening 10 leads.

The opening 10 gives access to a portion of the bearing holder requiring lubrication.

The external ferrule 2 also has an annular shape with a larger inner diameter than the outer diameter of the hub. The external ferrule 2 extends around the hub 1 and a distance from the latter.

The external ferrule 2 comprise an annular wall having a radially internal, surface 21 with respect to the axis X, and a radially external surface 22 opposite to the surface 21.

The ferrule comprises an opening 20, called hereafter radial opening 20, leading into the two opposite surfaces 21 and 22.

Although not shown in FIG. 3, the connecting arms B connect the hub 1 to the external ferrule 2 and are arranged in different angular positions from one another around the axis X.

The connecting arms B extend radially from the radially external surface 11 of the hub 1, until the radially internal surface 22 of the ferrule 2.

Thus provided in the housing, between the hub 1 and the ferrule 2, is a flow space with a generally annular shape locally interrupted by each connecting arm B.

The inter-turbine housing also comprises a plurality of aerodynamic fairings 4 called "aerodynamic profiles," which are interleaved between the hub 1 and the external ferrule 2, and between the connecting arms B. Each of these parts 4 extends over a limited angular sector of the axis X. The parts 4 are designed so that, once assembled to one another, they define together an annular shape around the axis X that can be placed in the annular space provided between the hub 1 and the ferrule 2.

The plurality of fairings 4 defines an air stream arranged between the hub 1 and the external ferrule 2. The stream has as its function to redirect air coming from the turbine arranged upstream of the inter-turbine housing, toward the turbine downstream of the inter-turbine housing.

Figure 1:
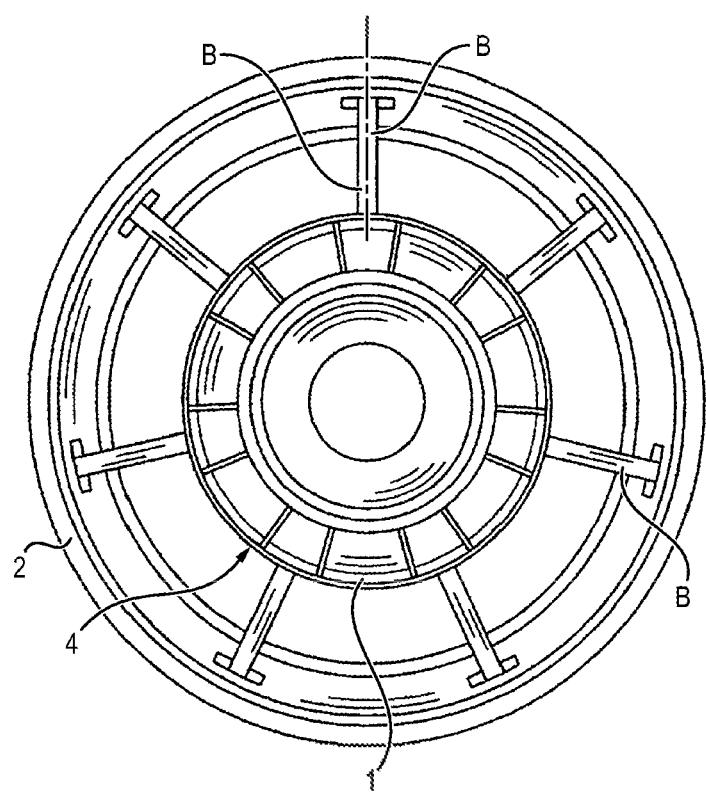
FIG. 1, already discussed, is a section view of an inter-turbine housing of a turbine engine.
Figure 2:
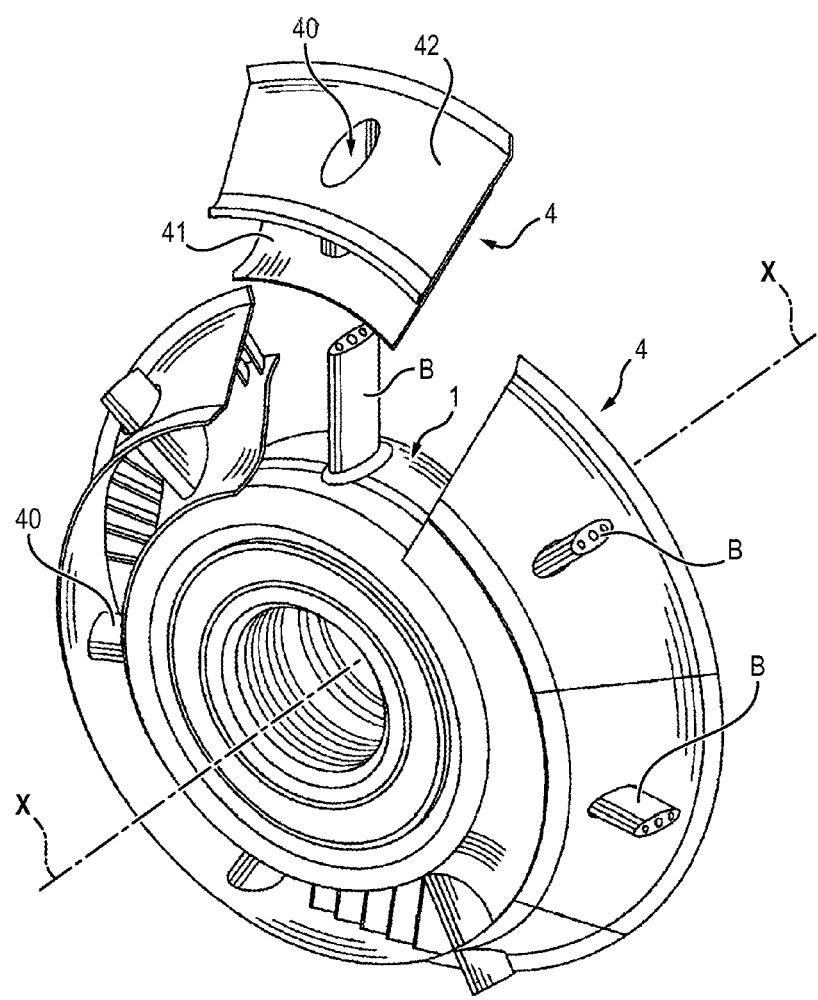
FIG. 2, already discussed, is a three-dimensional view of the inter-turbine housing shown in FIG. 1.

A given aerodynamic profile 4 typically comprises a radially internal wall 41, a radially external wall 42, and a hollow aerodynamic arm 40 connecting the two walls 41 and 42, in conformity with FIG. 2 already described in the introduction.

The radially internal wall 41 is designed to be disposed facing the hub 1, and the radially external wall is designed to be positioned facing the ferrule 2.

The aerodynamic arm 40 extends in a substantially radial direction with respect to the axis X.

The hollow aerodynamic arm 40 of the aerodynamic part 4 defines an internal radial passage with respect to the axis X, when the part 4 is arranged between the hub 1 and the external ferrule 2.

The internal passage of a connection arm B is designed to be aligned radially with a radial opening 20 formed in the external ferrule, and with an access opening 10 formed in the hub, when the fairing 4 is installed between the hub 1 and the ferrule 2.

The aerodynamic arm 40 is rectilinear.

The unit therefore comprises two different types of arms arranged radially between the hub 1 and the ferrule 2: on the one hand, the connecting arms B, having the principal function of mechanically retaining the hub 1 with respect to the ferrule 2, and on the other hand the aerodynamic arms 40, which are arranged at different angular positions than the connecting arms B, and which have as their main function to participate in the delimitation of the fluid flow stream between two turbines.

One can for example provide for an alternating disposition of the arms B and 40 around the principal axis X.

The turbine engine unit also comprises at least one lead-through 3. The lead-through 3 has the principal function of feeding lubricant to the bearing holder of the hub 1, for example with oil.

The lead-through 3 comprises a first pipe 30 designed to be connected to the hub 1.

The first pipe 30 comprises a generally rectilinear hollow body.

The first pipe present has a cross-section suitable to be placed inside an aerodynamic arm 40, without however the external surface of the first pipe 30 touching the internal surface of the arm 40, so that there remains a residual space between the pipe 30 and the arm 40 which accommodates it.

The first pipe 30 comprises a first end portion 31, a second end portion 33, and an intermediate portion 32 connecting together the two end portions 31 and 33.

Figure 4:
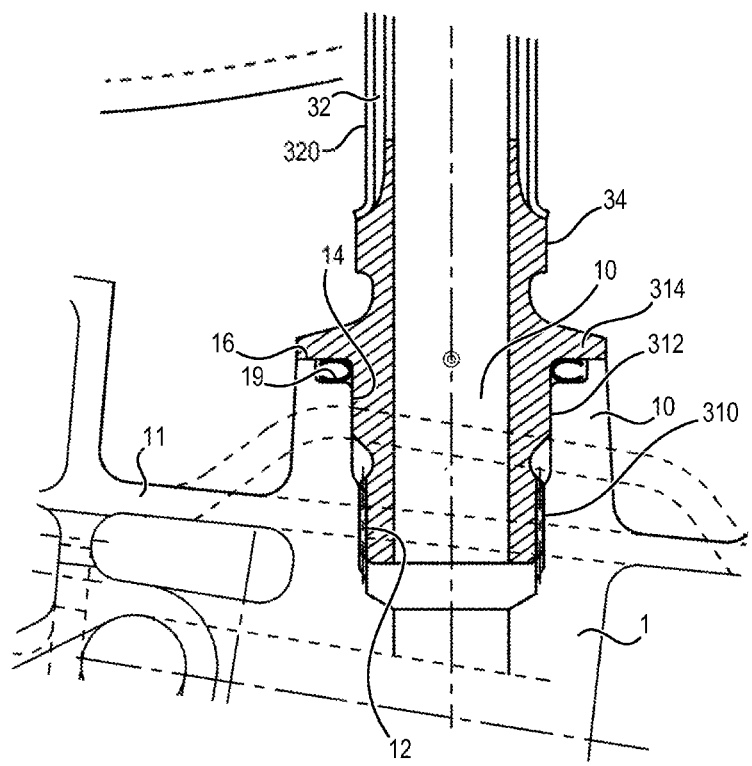
FIG. 4 is an enlarged view of a portion of the turbine engine unit shown in FIG. 3.

With reference to FIG. 4, the hub 1 comprises a cavity leading to its radially external surface 11 through the access opening 10.

The cavity has a shape suitable for receiving at least partially the end portion 31 of the first pipe 30.

The hub 1 comprises an internal thread 12 leading into the cavity so as to form a nut.

The hub 1 also comprises an internal guide surface 14 giving into the cavity, centered on a radial axis R, secant for example with the main axis X of the turbine engine.

The guide surface 14 is a cylinder of revolution (that is of circular cross-section).

The hub 1 also has a free circumferential edge protruding radially to the outside from the surface 11 with respect to the axis X. The edge 16 defines a perimeter of the access opening 10.

The end portion 31 of the pipe 30 is suitable to be screwed to the hub 1; it has an axial oil outlet opening.

The portion 31 has in particular an external thread 310 forming a screw for cooperating with the internal thread 12 forming a nut.

When the threads 12 and 310 are engaged with one another, the first pipe is put into fluid communication with the bearing holder of the hub 1.

The end portion 31 also has a circumferential guide surface 312 complementary to the internal surface 14.

The surfaces 14 and 132 allow mobility to be prohibited in any other direction that the screw axis R of the end portion 31 with respect to the hub, when the portion 31 is screwed to the hub by mutual cooperation of the threads 12 and 310.

The portion 31 also has a collar 314 with a diameter greater than the diameter of the opening 10 defined by the edge 16. The collar has in particular a surface designed to abut against the edge 16 when the portion 31 is inserted, along the radial axis R and in a centrifugal direction, into the cavity, via the opening 10.

The collar 314 therefore limits the insertion and/or screwing travel of the end portion 31 in the hub 1.

The hub 1 has a wall terminating in the edge 16 having a shoulder facing the cavity. This shoulder defines at least one accommodation extending between the end portion 31 of the pipe 30 and the hub 1 when the threads 310 and 12 are, engaged in one another. Placed in this accommodation are sealing means 19 allowing the fluid connection between the end portion 31 of the first pipe 30 and the hub 1 to be sealed. For example, these sealing means 19 comprise one or more metal seats having the shape of a C, particularly suitable to an environment as hot as a bearing holder.

Moreover, the channel 30 comprises a tightening portion 34 grippable by a gripping tool so as to apply a tightening torque to the lead-through.

The collar 314 is located between the tightening portion 34 and the guide surface 312.

Figure 5:
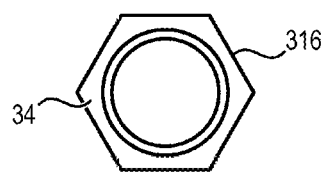
FIG. 5 illustrates ne section of a lead-through according to an embodiment of the invention.

With reference to FIG. 5, the tightening portion 34 comprises a plurality of tightening flats defining a free surface 316 with a polygonal surface grippable by the gripping tool, such as a tightening wrench.

The number of tightening flats can be equal to 6 and the surface 316 can in this case have a hexagonal section.

Returning to FIG. 4, the intermediate portion 32 of the first pipe 30 is designed to be placed inside an aerodynamic arm 40.

The tightening portion 34 is located between the intermediate portion 32 and the end portion 31.

The tightening portion 34 is more precisely located between the intermediate portion 32 and the collar 314.

The intermediate portion 32 has for example a tubular shape.

The intermediate portion 32 has an outer diameter strictly less than the minimum internal diameter of the arm 40 that accommodates it, so as to allow the intermediate portion not to touch the interior surface of the arm 40, but is located at a distance from the latter.

The pipe 30 can be dimensioned to provide for the function of transit of fluid under pressure, but not for a function of support or underpinning mechanical parts as is the case with the arms B. The cross-section of the pipe 30 can therefore be defined according to optimized design practices of simple pipes and preferably be of standard dimensions.

The end portion 33, opposite the end portion 31, continues the intermediate portion 32.

The portion 33 is provided with an axial oil entry opening designed to be aligned with the radial opening 20 formed in the external ferrule 2.

The portion 33 is provided with a conical extension 330 forming for example a nipple, the axial opening being formed in the nipple.

Moreover, the portion 33 provided with an external thread 332.

The portion 33 has an outer diameter less than or equal to the minimum inner diameter of the arm 40. In this manner, the first pipe 30 can be engaged, by its portion 33, into the aerodynamic part 4 from this radially internal wall 41, through its aerodynamic arm 40, the come back out of the part 4 through its other wall 42.

The different portions of the pipe 30 are firmly connected to one another.

The end portion 31, the tightening portion 34 and the collar can thus constitute a single part.

The intermediate portion 32 can also be another part welded to the tightening portion 34, and the end portion 31 be another part welded to the intermediate portion 32.

The lead-through 3 also comprises thermal insulation 320 suitable for extending around the intermediate portion 32 of the first pipe 30.

The thermal insulation has a generally tubular shape.

The thermal insulation has an external section with dimensions suited so that the thermal insulation is at a distance from the internal surface of the aerodynamic arm 40, when the thermal insulation is placed inside the aerodynamic arm 40.

In this manner, when the first channel 30 is inserted into an arm 40, the thermal insulation 320 does not touch the inner surface of this arm 40. The space left between the pipe 30 and the arm 40 which surrounds it allows mechanical or temperatures loads between the arm 40 and the thermal insulation 320 to be avoided.

The presence of the thermal insulation 320 is however optional. In the absence of this thermal insulation 320, the pipe 30 is directly facing the internal surface of the arm 40.

It is then arranged that the pipe 30 itself has an external section with dimension suitable so that the pipe 30 is at a distance from the internal surface of the aerodynamic arm 40, when the pipe 30 is placed inside the hollow aerodynamic arm.

Figure 6:
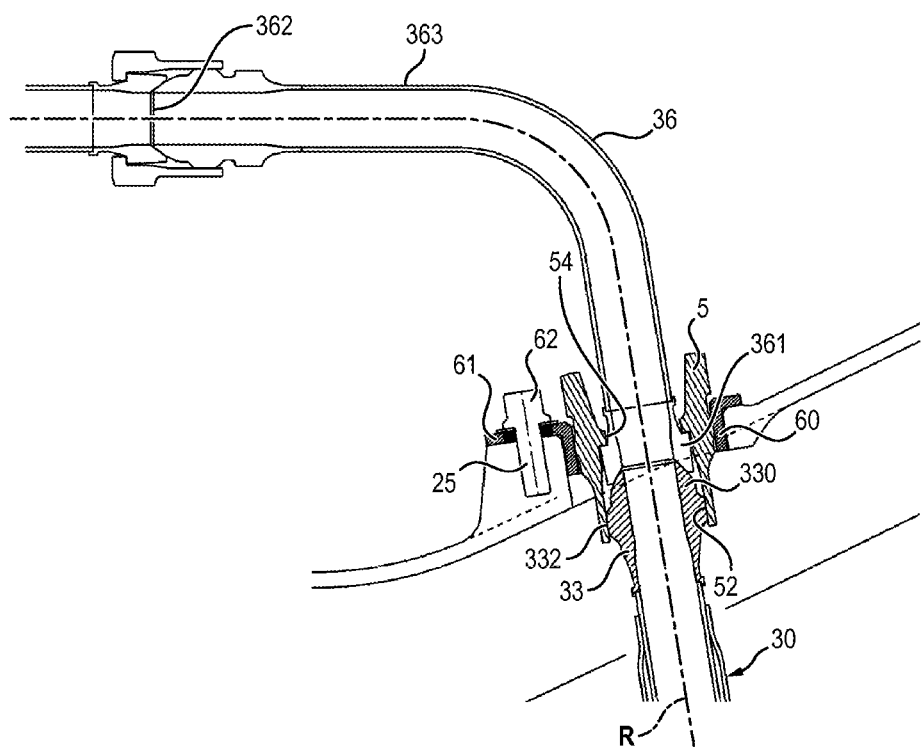
FIG. 6 is an enlarged view of another portion of the turbine engine unit shown in FIG. 3, according to a first embodiment.

With reference to FIG. 6, the first pipe 30 has a sufficiently short length with respect to the inner diameter of the annular ferrule 2 to allow, during assembly of the different parts of the inter-turbine housing, an engagement of the annular ferrule 2, along the principal axis X, around the pipe 30 already screwed to the hub 1, this until its end portion 33 is aligned with a corresponding radial opening 20 of the ferrule 2.

This length of the first pipe, measured between its two ends 31 and 33, allows in particular assembly of the external ferrule 2 after the hub 1 and the first pipe 30 of the lead-through 3 have been screwed together.

Moreover, the lead-through 3 comprises a second pipe 36 designed to extend the first pipe 30 and be put into fluid communication with the latter.

Along one direction of flow in the lead-through, the second pipe 36 is situated upstream of the first pipe 30.

The lead-through also comprises mutual connection means of the two pipes 30 and 36.

The second pipe 36 comprises an end portion 361 with a concave shape suitable for receiving the conical extension 330 of the nipple formed at the end 33 of the first pipe 30.

The connector 361 and the nipple 330 are held in fluid communication by means of the connection means 5.

The connection means 5 can have the shape of a connecting ring 5 defining an accommodation for the end portion 361, the nipple 330 and the thread 332.

The connecting ring 5 comprises an internal thread 52 giving into its accommodation, and suitable for cooperating with the external thread 332.

The connecting ring 5 also comprises an internal shoulder 54 with a shape suitable for retaining axially the end portion 361 in the accommodation when the threads 332 and 52 are engaged in one another.

Moreover, the second pipe 36 comprises an end portion 362 opposite to the portion 361, connectable to a third pipe or to a lubricant supply device.

The portion 362 can for example be identical to the end portion 33 of the first pipe 30.

The second pipe 36 can have an intermediate portion 363 connecting its two ends 362 and 362, and with a diameter suitable for passing through the radial opening 20 formed in the annular ferrule 2.

The intermediate portion 363 is bent between its two opposite end portions 361 and 362 at an angle such that, when the first pipe is screwed to the hub 1 and the second pipe 36 is connected to the first pipe 30, the end portion 362 extends parallel to the principal axis X, at a greater radial distance from the axis X than the ferrule 2. The lead-through 3 is therefore partially located radially outside the inter-turbine housing, which is delimited on the outside by the ferrule 2.

Moreover, the inter-turbine housing comprises means 6 or blocking the feed-through 3 with respect to the external ferrule 2.

The blocking means 6 comprise an annular holding ring 60 suitable for surrounding the connecting ring 5, and thus limiting the displacement of the ring 5 in the plane normal to the axis R.

The holding ring 60 has a collar 61 with a shape suitable for coming into abutment against the radially external surface 22 of the ferrule 2, when the holding ring 6 is engaged at least partially in the radial opening of the external ferrule 2.

The collar 61 is pierced with at least one through hole aligned with a blind hole 25 formed in the radially external surface 22 of the ferrule 2 when the holding ring 60 is engaged at least partially in the radial opening of the external ferrule, the blind hole 25 forming a nut.

The blocking means 6 also comprise a screw 62 with a diameter suitable for passing through the through hole formed in the collar 61, and be screwed into the blind, hole formed in the ferrule 2, so as to block any displacement of the holding ring parallel to the axis R.

The diameter of the through hole formed in the collar 61 can be greater than the diameter of the screw 62, so as to allow slight clearance in the holding ring 60 in a plane normal to the axis R, when the ring is partially engaged in the radial opening of the ferrule 2.

The connecting ring 5 can have a spherical extension designed to be supported against the interior surface of the holding ring 60 and thus plug the annular space between the two rings in a fluid-tight manner.

With reference to FIG. 6bis, an annular fluid-tight seal 57 can be arranged between the interior surface of the blocking ring 60 and the exterior surface of the connecting ring 5 placed inside.

The connecting ring 5 can also comprise a tightening portion 58 grippable by a gripping tool, protruding with respect to the radially exterior surface 22 of the ferrule 2.

The ring can thus be easily tightened by an operator, from outside the inter-turbine housing.

Assembly of the Turbine Engine Unit

A method for assembling the different turbine engine parts previously described wilt now be described.

In a first step, the pipe 30 is attached to the hub 1.

During this first step, the end portion 31 of the first pipe 30 is inserted into the cavity formed in the hub 1, through the access opening 10.

An operator engages a gripping tool with the tightening surface 316 of the tightening portion 34, and drives in rotation the pipe 30 in a screwing direction of the external thread 310 in the thread 12.

Figure 7:
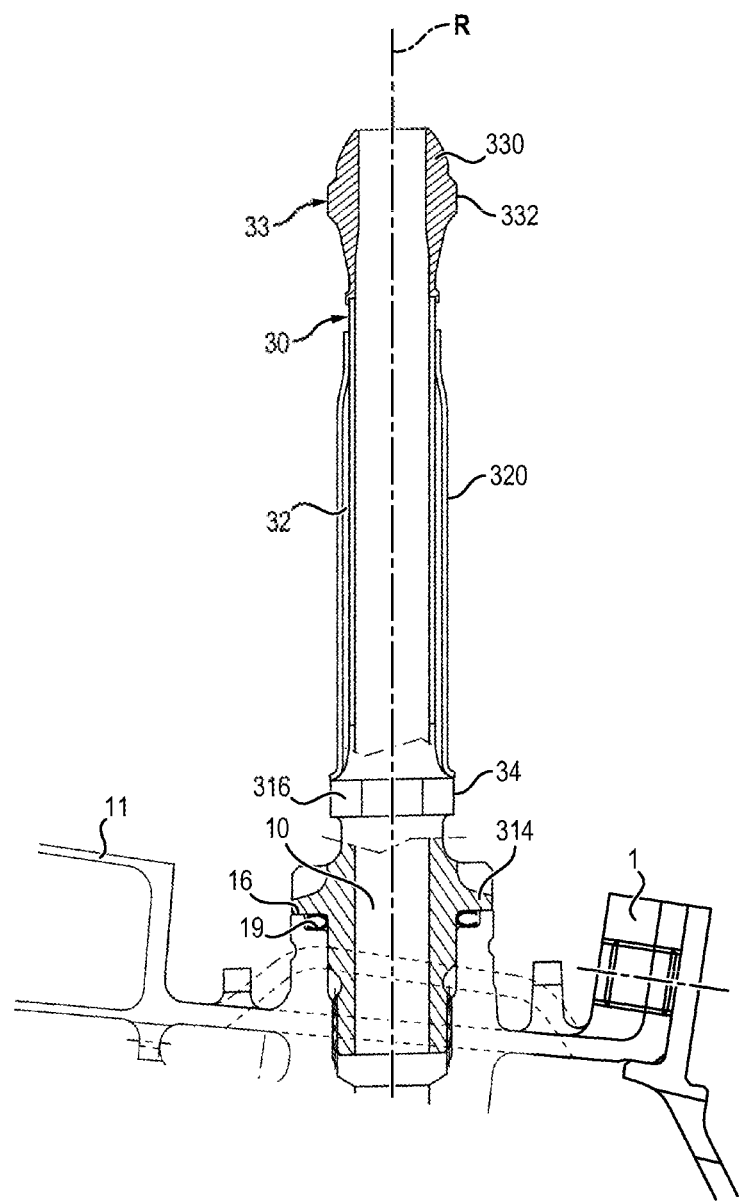
FIGS. 7 to 12 show parts of the turbine engine unit shown in FIG. 3, at different stages of its assembly.

The pipe 30 is the screwed to the hub 1 in conformity with FIG. 7.

After screwing (or during screwing), the complementary guide surfaces 14 and 314 are put into contact with one another, thus blocking any displacement of the screwed pipe 30 in a plane normal to the screwing axis R.

The location of the tightening portion 34 between the intermediate portion 32 and the end portion 31 screwed to the hub 1 lifts the diameter constraints imposed on the intermediate portions according to the prior art. It is henceforth possible to reduce the diameter of the intermediate portion 31 without however weakening the pipe 30 during its screwing by driving the tightening portion 34 in rotation, by means of a gripping tool, and consequently the diameter of the arm 40 which accommodates it, and consequently the diameter of the aerodynamic arm which accommodates the 40.

Figure 8:
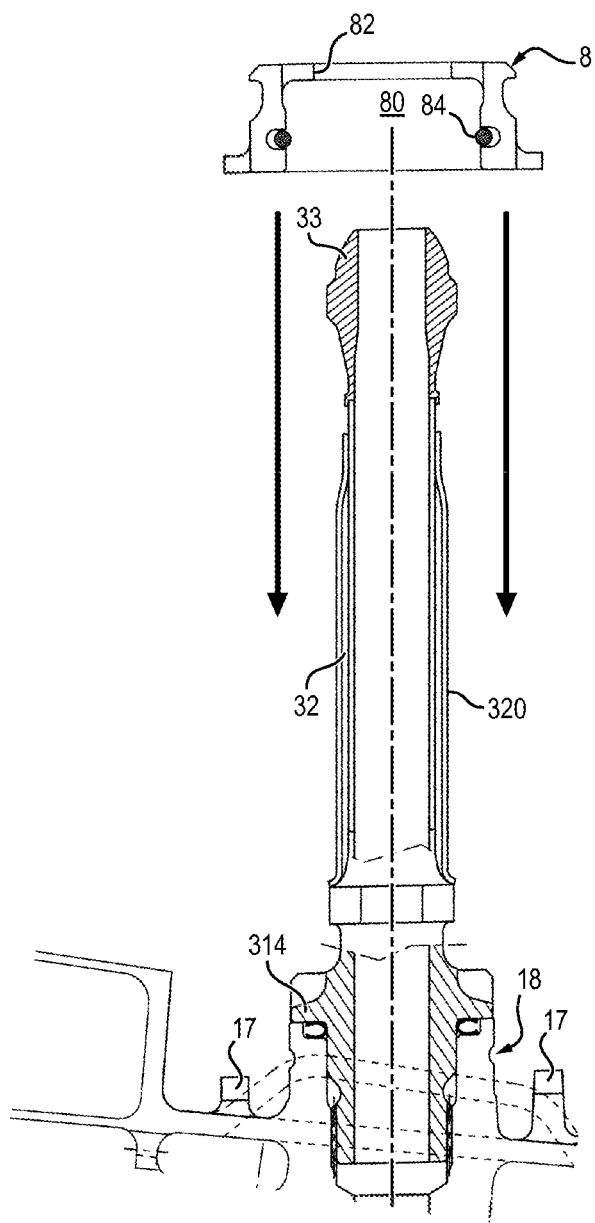

With reference to FIG. 8, the attachment of the pipe 30 to the hub 1 can also comprise the positioning of a movable holding ring 8 to block a displacement of the collar 314 along the axis R, for example by uncontrolled unscrewing of the first pipe 30 from the hub 1.

The holding ring 8 defines an internal accommodation 80 with a sufficiently large diameter to contain the collar 314 and the edge 16 against which the collar 314 is in abutment.

The holding ring 8 is also suitable to be engaged, by rotation of the ring 8 along the axis R, in at least one notch formed in the hub 1, when the collar 314 and the edge 16 are in their accommodation 80.

The holding ring 8 has at least one abutment 82 protruding into the accommodation 80, the abutment 82 defining a minimum inner diameter of the ring 8.

The minimum diameter of the ring remains greater than the outer diameter of the first pipe 30 and of the thermal insulation 320.

The abutment is suitable for limiting or even prohibiting an axial displacement along the axis R of the collar 314, when the ring is engaged in the notch(es) 17 of the hub 1.

The holding ring 8 can comprise a circlip 84 with dimensions suitable for being partially received in a corresponding recess 18 of the hub 1, so as to facilitate the positioning of the ring at a radial position which allows its engagement in the notch(es) 17 of the hub 1. The circlip is formed from a metallic material.

Figure 9:
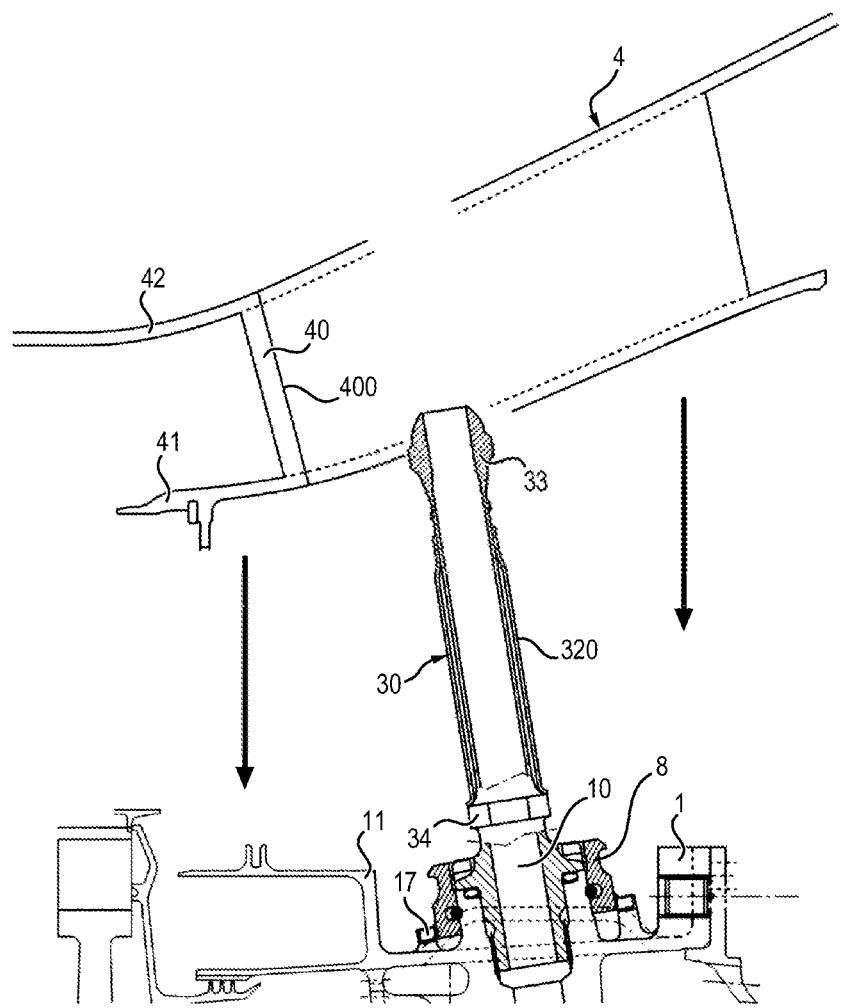

With reference to FIG. 9, the end 33 of the pipe 30, free at this stage of assembly, is passed inside the arm 40 of one of the aerodynamic fairings 4.

The aerodynamic fairing 4, designed to extend over a limited angular sector around the axis X, can be placed close to the hub 1 in a substantially centrifugal direction (for example the axis R) illustrated by the arrows of FIG. 9, and attached to the hub 1 by appropriate means. To accomplish this, the end portion 33 of the pipe 30 is inserted into the aerodynamic arm 40 by the radially internal surface 41, then leaves the arm 40 by the radially external wall 42 of the aerodynamic fairing 4.

Once the fairing 4 is attached to the hub 1, the intermediate portion 32 passes radially through the arm 40 of this part and the end portion 33 of the first pipe 30 is located at a radial position more distant from the axis X than that of the aerodynamic fairing 4.

The preceding steps are repeated for each aerodynamic fairing 4 until the annular air stream around the axis X is formed, for each first pipe 30 to be arranged radially around the axis X, and for each connecting arm to be arranged radially around the axis X.

Figure 10:
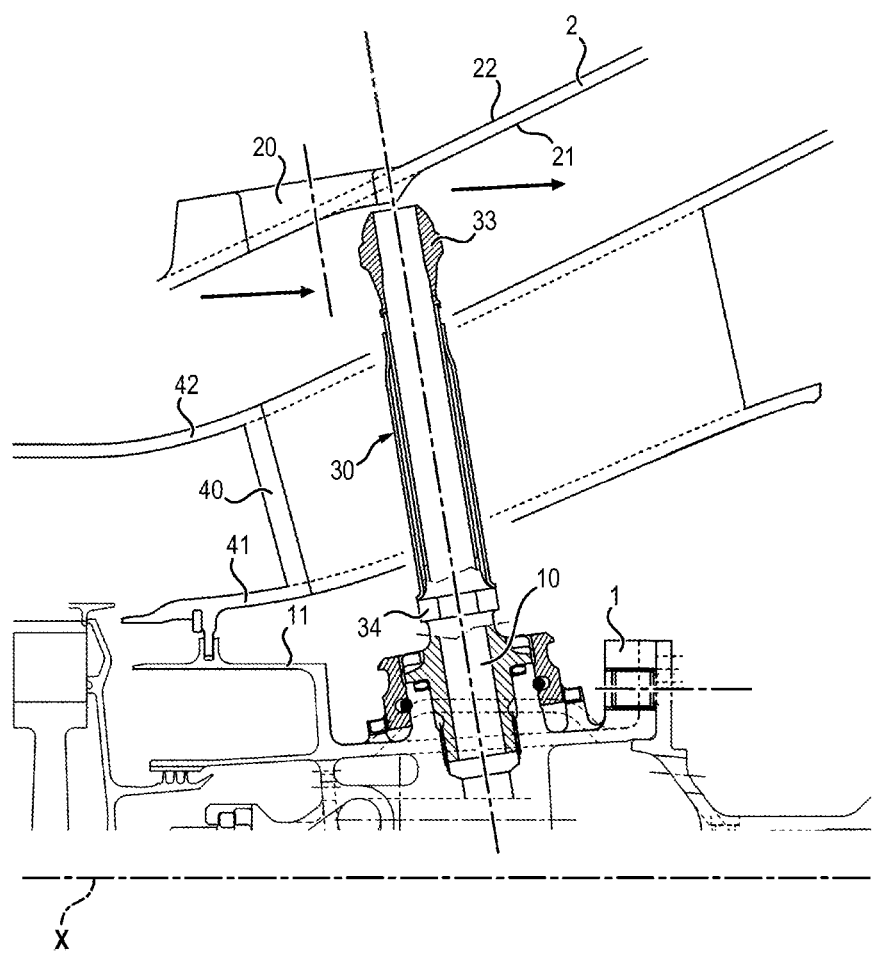

With reference to FIG. 10, the annular ferrule 2 is then attached to the hub 1 via the connecting arms B.

To accomplish this, the "hub 1+aerodynamic fairings 4 defining the air stream+connecting arms B+first pipes 30 passing through the connecting arms B" is aligned with respect to the ferrule 2 so that the axis of the ferrule and the axis of the hub 1 are superimposed on the axis X. The connecting arms B, and the first pipes then extending radially with respect to this common axis X.

The aforementioned assembly is inserted into the annular ferrule 2 by displacement along the axis X, with respect to the ferrule 2, until the end portion 33 of each pipe 30 is aligned with a corresponding radial opening 20 of the ferrule 2. During this displacement, the end portion 33 is located at a distance from the radially internal surface 21 of the ferrule, due to the length selected for the pipe 30.

In this position aligned with the opening 20, the connecting arms B are then attached to the ferrule by appropriate means.

Figure 11:
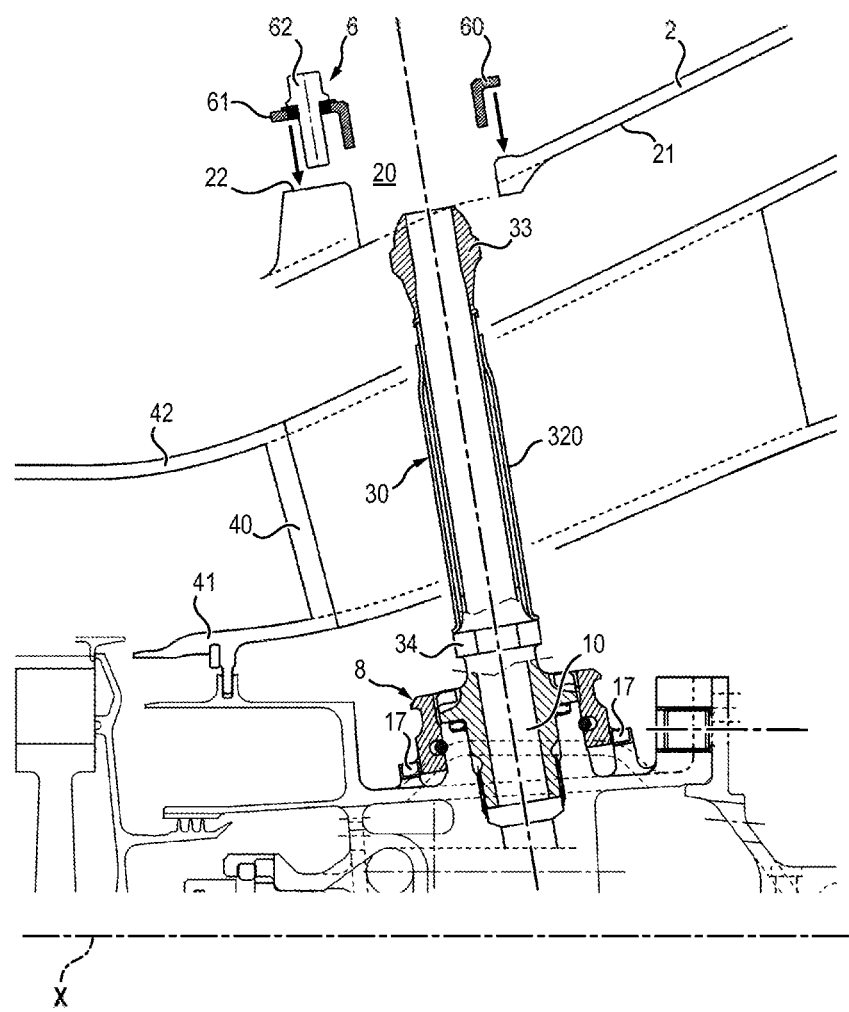

With reference to FIG. 11, the blocking means 6 are attached to the external ferrule 2, More precisely, the blocking ring 60 is partially inserted into the radial opening through the outside of the ferrule, in a centrifugal direction, until its collar comes into abutment against the radially external surface of the ferrule 2, and so that its through hole is aligned with the corresponding blind hole formed in the ferrule. The screw is then engaged through the hole in the collar, then into the blind hole of the ferrule 2.

Figure 12:
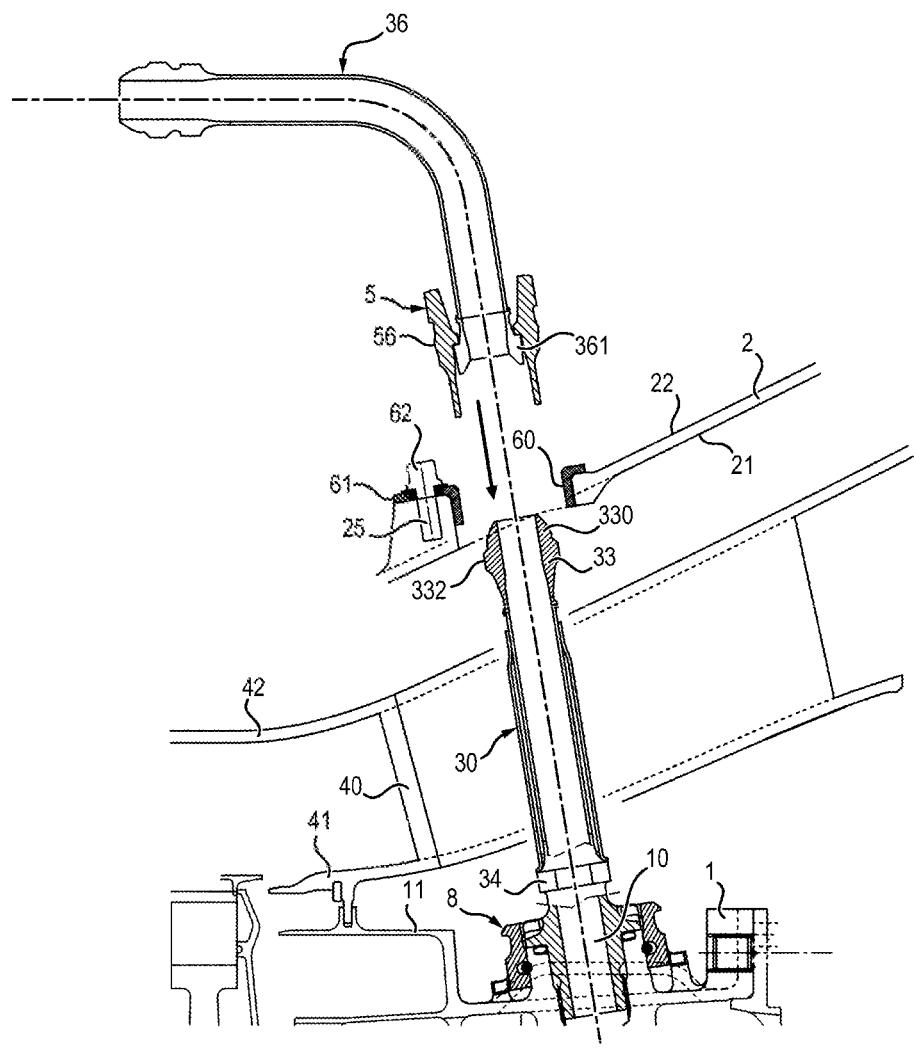

With reference to FIG. 12, the second pipe 36 is put into fluid communication with the first pipe 30, by means of connecting means 5.

More precisely, the end portion 361 is inserted into the accommodation of the ring 5 then connected, for example by welding, to the curved intermediate portion 363 of the pipe 36.

The connecting ring is then inserted into the blocking ring, itself inserted into the radial opening.

The spherical extension protruding on the exterior perimeter of the connecting ring then presses on the internal surface of the blocking ring, thus blocking the connecting ring along axis R, and thus maintaining the portions 332 and 361 in fluid communication with one another.

At the same time, the external surface 332 and the internal surface 52, which are complementary, are placed into contact so as to improve the seat of the fluid connection between the nipple 330 of the pipe 30 and the concave end portion 361 of the pipe 36.

The assembly of the lead-through 3 with the inter-turbine housing as shown in FIG. 3 is then obtained.

Moreover, the inter-turbine housing is assembled with the two turbines, upstream and downstream, and the lead-through 3 is connected to a lubrication source.

In the proposed assembly method, the step of screwing the first pipe 30 to the hub 1 comprising the bearing holder is implemented prior to the attachment of the ferrule 2 to the hub 1 by means of the connecting arms, and before the assembly of the aerodynamic fairings 4 which forms the air stream between the turbines of the turbine engine.

This order of assembly is advantageous in that it allows a replacement of the external ferrule 2 and/or at least one connecting arm and/or at least one aerodynamic fairing 4, without having to totally disassemble the lead-through first. In fact it is possible, during such a replacement, to leave the first pipe 30 of the lead-through 3 in fluid connection with the bearing holder.

During the operation of the turbine engine, oil coming from said source is communicated to the bearing holder to lubricate it, by passing successively through the pipe 36, then through the pipe 30, then through the access opening 10 formed in the hub 1.

The invention claimed is:

1. A turbine engine unit comprising:
   an inter-turbine housing comprising:
      a hub comprising a bearing holder,
      a ferrule extending around and at a distance from the hub,
      at least one arm extending radially between the hub and the ferrule,
      at least one lead-through for lubricating the bearing holder, the lead-through comprising to first pipe having:
         an end portion that can be screwed to the hub to put the first pipe into fluid communication with the bearing holder,
         an intermediate portion attached to the end portion placed inside the arm when the end portion is screwed to the hub,
         tightening portion attached to the end portion and suitable to be driven in rotation by a gripping tool,
      wherein the fact that the tightening portion is situated between the end portion that can be screwed and the intermediate portion.

2. The turbine engine unit according to claim 1, comprising at least one seal for putting the end portion into sealed fluid communication with the bearing holder, when the end portion is screwed to the hub.

3. The assembly for turbine engines according to claim 1, wherein the tightening portion comprises a plurality of tightening sections defining a free surface of polygonal section grippable by a gripping tool.

4. The turbine engine unit according to claim 1, wherein:
   the ferrule has an annular shape around a principal axis, and has at least one radial through opening,
   the first pipe comprises a second end portion opposite to the end portion which can be screwed to the hub,
   the first pipe has a sufficiently short length to allow insertion, along the principal axis, of the hub and of the first pipe screwed to, the huh into the ferrule, until the second end portion is aligned with the radial through opening while the ferrule extends around the first pipe screwed to the hub.

5. The turbine engine unit according to claim 4, wherein the lead-through also comprises a second pipe suitable for being put into fluid communication with the first pipe, the lead-through having dimensions suitable for passing through the radial through opening of the ferrule.

6. The assembly for turbine engines according to claim 1, wherein the first pipe comprises a second end portion opposite to the end portion which can be screwed to the hub, the lead-through having, from the intermediate portion included until the second end portion, an outer diameter smaller than or equal to a minimum inner diameter of the arm.

7. The turbine engine unit according to claim 1, wherein the lead-through also comprises thermal insulation extending around the intermediate portion of the first pipe, the thermal insulation having an outer diameter strictly less than or equal to a minimum inner diameter of the arm.

8. The turbine engine unit according to claim 1, wherein the end portion has an external guide surface, and wherein the hub comprises a cavity to receive the end portion that can be screwed, the cavity having a diameter complementary to the external guide surface.

9. The turbine engine unit according to claim 1, wherein the first pipe comprises a portion forming a collar arranged between the end portion Which can be screwed and the tightening portion, the collar having a surface suitable for coming into abutment against the hub during screwing of the end portion to the hub.

10. An assembly method for a turbine engine unit according to claim 1, comprising steps of:
- screwing the end portion to the hub, by driving in rotation the tightening portion using a gripping tool, so as to put the first pipe into fluid communication with the bearing holder, and
- inserting the intermediate portion into the arm,
- attaching the arm to the ferrule,
- wherein the screwing step is carried out before the inserting step and/or before the attaching step.

* * * * *

UNITED STATES PATENT AND TRADEMARK OFFICE
CERTIFICATE OF CORRECTION

PATENT NO. : 10,557,376 B2
APPLICATION NO. : 15/575654
DATED : February 11, 2020
INVENTOR(S) : Philippe Pierre Vincent Bouiller et al.

It is certified that error appears in the above-identified patent and that said Letters Patent is hereby corrected as shown below:

In the Specification

Column 1, Line 21, change "moveable bearings)" to --moveable bearing(s)--;

Column 3, Line 23, change "rotation by a tightening" to --rotation by a--;

Column 3, Line 57, change "features taken atone" to --features, taken alone--;

Column 7, Line 24, change "metal seats" to --metal seals--;

Column 9, Line 24, change "means 6 or" to --means 6 for--;

Column 9, Line 48, change "allow slight" to --allow a slight--;

Column 9, Line 66, change "described wilt now" to --described will now--;

Column 10, Line 24, change "accommodates the" to --accommodates the arm--;

Column 11, Line 54, change "improve the seat" to --improve the seal--;

In the Claims

Column 12, Line 22, change "comprising to first" to --comprising a first--;

Column 12, Line 50, change "screwed to, the huh" to --screwed to the hub--; and

Column 13, Line 4, change "claim 1, to" to --claim 1,--.

Signed and Sealed this
Fourteenth Day of July, 2020

Andrei Iancu
*Director of the United States Patent and Trademark Office*